Feb. 26, 1924.                1,485,087
J. A. MEINHARDT
MOP
Filed May 31, 1923
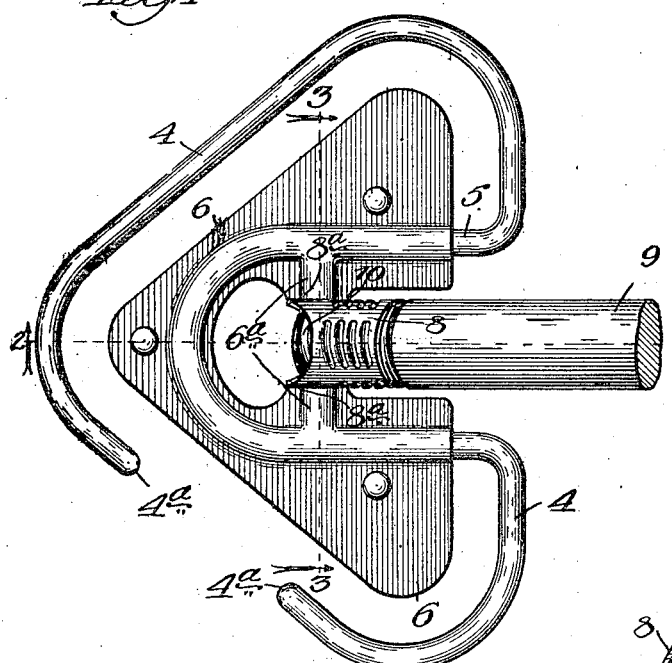
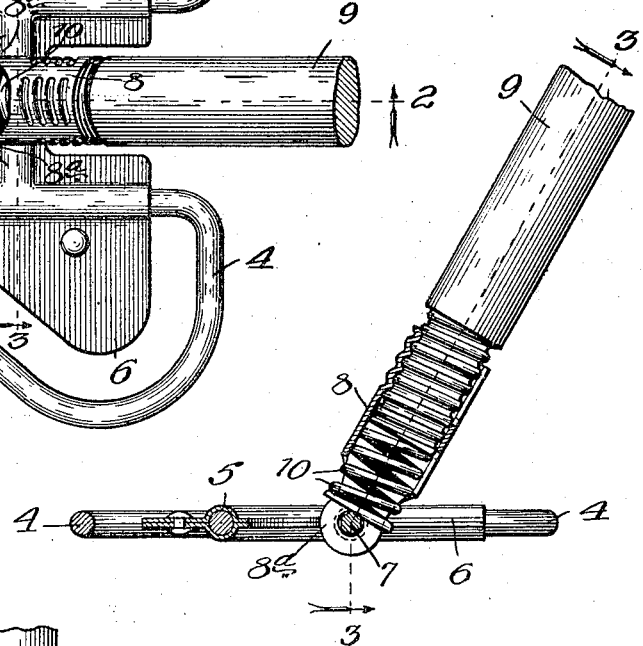
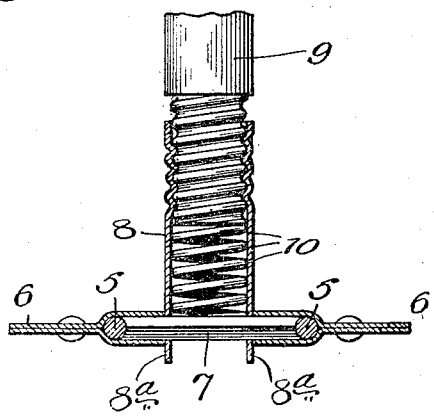
Inventor:
Jacob A. Meinhardt,
By Dyrenforth, Lee, Chritton and Wiles
Attys.

Patented Feb. 26, 1924.

1,485,087

UNITED STATES PATENT OFFICE.

JACOB A. MEINHARDT, OF CHICAGO, ILLINOIS.

MOP.

Application filed May 31, 1923. Serial No. 642,626.

*To all whom it may concern:*

Be it known that I, JACOB A. MEINHARDT, a citizen of the United States, residing at Chicago, in the county of Cook and State of Illinois, have invented a new and useful Improvement in Mops, of which the following is a specification.

My invention relates to an improvement in mops and is more particularly intended for use in the types thereof in which the swatch-carrying frame is formed of a continuous length of adequately strong rod-material or wire bent to provide an external open-ended loop over which to slip the fringed pad-like tube of the swatch and an arch-like internal loop, or other bearing, for pivotally carrying the socket by which the mop-handle is connected with the frame.

The primary object of my improvement is to facilitate adjustment of the mop-handle to cause it to extend, with adequate stability for use, at any desired angle relative to the frame.

In the accompanying drawing—

Figure 1 is a plan view of a mop-frame provided with my improvement and showing the handle broken;

Figure 2 is a section on line 2—2, Fig. 1, and

Figure 3 is a section on line 3—3, Fig. 2.

The frame 4 illustrated is of substantially triangular shape, being formed of a metal rod, or suitably stiff wire bent into the shape shown to provide the alining marginal extremities 4ª, in spaced relation, at a side of the frame, for enabling the flexible tube of the swatch (not shown) to be slipped at its ends on the said extremities and thence in opposite directions over the entire external frame-loop, the swatch-tube then bridging the space between the ends 4ª. The bending of the rod is also such as to form the internal loop 5 having secured to it a bearing-plate 6 like and for the same purpose as that of my pending application, Serial Number 614,594, filed January 24th, 1923, the plate being open about its center and having tubular bearings 6ª projecting in alinement with each other partway across the plate-opening.

In the tubular bearings 6ª is rigidly confined at its ends a pin 7 on which is pivoted, at its ears 8ª, the socket 8 for receiving the handle 9, the socket being preferably threaded, as shown, for screwing into it the threaded end of the handle. The pin 7 is of angular cross-section and preferably hexagonal to present any of three or four of its six flat faces to a spiral spring 10 in the socket and against which the handle-end therein abuts.

The plural-faced shaft 7 and spring confined against it in the socket by the handle, constitute the salient feature of my improvement. The handle serves to force the spring yieldingly against the pin to any desired degree of tension and enables the user of the mop, while in use, to readily turn the handle to cause it to extend to such angles relative to the frame as will adapt the mop to be operated to the best advantage in different positions of the work to be performed; and the spring-pressure against a face of the pin holds the handle in its adjusted position with sufficient rigidity to resist turning therefrom in working the mop.

I realize that considerable variation is possible in the details of construction herein shown and described and I do not intend to limit my invention thereto except as pointed out in the appended claims, in which it is my intention to claim all the novelty inherent in my invention as broadly as permissible by the state of the art.

I claim:

1. In combination, a mop-frame, a handle-pivoting pin of angular cross-section in the frame, a handle-receiving socket pivoted on the pin, a spring in the socket, and a handle fitting the socket to confine the spring therein yieldingly against the pin.

2. In combination, a mop-frame, a hexagonal handle-pivoting pin secured at its ends in bearings in the frame, a threaded handle-receiving socket having ears at which it is pivoted on the pin, a spiral spring in the socket, and a handle having a threaded end to work in the socket and engage the outer end of the spring to press its opposite end against the pin.

3. A mop-frame comprising a loop of general triangular shape and an arch-shaped loop within the triangular loop, said frame being formed of a continuous length of rod-like material having its ends terminating in spaced relation on a lateral side of the frame, a plate secured to said internal loop and provided with an opening, and a mop-handle pivoting-pin extending across the opening in said internal loop.

4. In combination, a mop-frame comprising a loop of general triangular shape and an arch-shaped loop within the triangular loop, said frame being formed of a continuous length of rod-like material having its ends alining in spaced relation on a lateral side of the frame, a plate secured to said internal loop and provided with an opening and bearings projecting toward each other across the opening, a handle-pivoting pin of angular cross-section secured at its ends in said bearings, a handle-receiving socket pivoted on the pin, a spiral spring in the socket, and a handle fitting the socket to engage the outer end of the spring and press its opposite end against the pin.

JACOB A. MEINHARDT.